United States Patent
Kim

(10) Patent No.: US 10,823,100 B2
(45) Date of Patent: Nov. 3, 2020

(54) METHOD AND APPARATUS FOR DIAGNOSING ENGINE SYSTEM WITH CONTINUOUS VARIABLE VALVE DURATION APPARATUS

(71) Applicants: Hyundai Motor Company, Seoul (KR); KIA Motors Corporation, Seoul (KR)

(72) Inventor: Seungbum Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/654,320

(22) Filed: Oct. 16, 2019

(65) Prior Publication Data

US 2020/0191086 A1    Jun. 18, 2020

(30) Foreign Application Priority Data

Dec. 14, 2018    (KR) .................. 10-2018-0162500

(51) Int. Cl.

| | |
|---|---|
| *F02D 41/22* | (2006.01) |
| *F02N 11/10* | (2006.01) |
| *F02D 41/06* | (2006.01) |
| *F02D 41/00* | (2006.01) |
| *F02D 41/14* | (2006.01) |
| *F01L 13/00* | (2006.01) |
| *F02D 13/02* | (2006.01) |

(52) U.S. Cl.
CPC .......... *F02D 41/22* (2013.01); *F01L 13/0036* (2013.01); *F02D 13/0207* (2013.01); *F02D 41/009* (2013.01); *F02D 41/062* (2013.01); *F02D 41/144* (2013.01); *F02D 41/1456* (2013.01); *F02N 11/10* (2013.01); *F01L 2013/111* (2013.01); *F01L 2800/11* (2013.01); *F02D 2013/0292* (2013.01); *F02D 2041/0092* (2013.01); *F02D 2041/228* (2013.01)

(58) Field of Classification Search
CPC ...... F02D 41/22; F02D 41/062; F02D 41/009; F02D 41/144; F02D 41/1456; F02D 13/0207; F02D 2041/0092; F02D 2041/228; F02D 2013/0292; F02N 11/10; F01L 13/0036; F01L 2800/11; F01L 2013/111
USPC ............. 123/90.11; 73/114.79; 701/103, 107
See application file for complete search history.

*Primary Examiner* — Hai H Huynh
(74) *Attorney, Agent, or Firm* — Brinks Gilson & Lione

(57) ABSTRACT

A method for diagnosing an engine system including a continuous variable valve duration (CVVD) apparatus, a driving unit of the CVVD apparatus including a first driving unit and a second driving unit, a CVVD position detector configured to detect a position of the CVVD apparatus, a camshaft position detector configured to detect a position of a camshaft, a front lambda detector configured to detect a lambda value at front of intake valve, and a controller may include the steps of starting the engine, detecting measured values of the front lambda detector during combustion of first to fourth cylinders (first to fourth lambda values), determining whether CVVD driving unit is misaligned according to the detected first to fourth lambda values, and generating a warning notification when the CVVD driving unit is determined to be misaligned.

10 Claims, 21 Drawing Sheets

METHOD AND APPARATUS FOR DIAGNOSING ENGINE SYSTEM WITH CONTINUOUS VARIABLE VALVE DURATION APPARATUS

CROSS-REFERENCE TO RELATED APPLICATION

This application claims priority to and the benefit of Korean Patent Application No. 10-2018-0162500, filed on Dec. 14, 2018, which is incorporated herein by reference in its entirety.

FIELD

The present disclosure relates to a method and apparatus for diagnosing an engine system with continuous variable valve duration apparatus.

BACKGROUND

The statements in this section merely provide background information related to the present disclosure and may not constitute prior art.

In general, an internal combustion engine generates power by receiving and burning fuel and air to a combustion chamber. When drawing air, by driving of a camshaft, an intake valve is operated, and while the intake valve is opened, air is drawn into the combustion chamber. Further, an exhaust valve is operated by driving of the camshaft, and while the exhaust valve is opened, air is discharged from the combustion chamber.

However, an optimal intake valve/exhaust valve operation is changed according to a rotation speed of an engine. That is, an appropriate lift or valve opening/closing time is changed according to a rotation speed of the engine. In this way, in order to implement an appropriate valve operation according to a rotation speed of the engine, a continuous variable valve lift (CVVL) apparatus has been developed in which a shape of a cam that drives the valve is designed in the plural or in which a valve operates with another lift according to the engine rotation number.

Further, continuous variable valve timing (CVVT) technology that adjusts an open time of the valve has been developed, and this is technology in which a valve open/close time point is simultaneously changed in a state in which valve timing is fixed.

However, we have discovered that a conventional CVVL or CVVT has a complex configuration and a high cost.

Therefore, a continuous variable valve duration (CVVD) apparatus that can adjust a duration of a valve according to an operation state of the engine has been developed.

In order to apply the CVVD apparatus to the engine system, a method of diagnosing whether the CVVD apparatus is normally operating is required.

Particularly, in the case of the CVVD apparatus having two driving units, each driving unit is in charge of two cylinder valves to drive a total of four cylinder valves. In this regard, if the two driving units are not assembled normally so that a misalignment occurred, then the valve control by the CVVD driving unit cannot be performed normally. There is a need for a process of diagnosing these issues.

The above information disclosed in this Background section is only for enhancement of understanding of the background of the present disclosure, and therefore it may contain information that does not form the prior art that is already known to a person of ordinary skill in the art.

SUMMARY

The present disclosure provide a method and apparatus for diagnosing an engine system including a continuous variable valve duration (CVVD) apparatus capable of diagnosing whether a misalignment is occurred while a driving unit of the CVVD apparatus is assembled.

According to one aspect of the present disclosure, a method for diagnosing an engine system including a continuous variable valve duration (CVVD) apparatus, a driving unit of the CVVD apparatus including a first driving unit and a second driving unit, a CVVD position detector configured to detect a position of the CVVD apparatus, a camshaft position detector configured to detect a position of a camshaft, a front lambda detector configured to detect a lambda value at front of intake valve, and a controller may include the steps of: starting, by the controller, the engine, detecting, by the controller, measured values of the front lambda detector during combustion of first to fourth cylinders (the measured values are first to fourth lambda values), determining, by the controller, whether CVVD driving unit is misaligned according to the detected first to fourth lambda values, and generating, by the controller, a warning notification when the CVVD driving unit is determined to be misaligned.

The step of determining whether the CVVD driving unit is misaligned may include the steps of determining, by the controller, the CVVD driving unit to be misaligned when the first and second lambda values are rich and the third and fourth lambda values are lean or when the first and second lambda values are lean and the third and fourth lambda values are rich, and performing, by the controller, the detecting the first to fourth lambda values again.

The step of detecting the first to fourth lambda values may comprise the steps of performing lambda 1 control of the engine, checking the measured value of the front lambda detector during combustion of the first cylinder (the first lambda value), checking the measured value of the front lambda detector during combustion of the third cylinder (the third lambda value), checking the measured value of the front lambda detector during combustion of the fourth cylinder (the fourth lambda value), checking the measured value of the front lambda detector during combustion of the second cylinder (the second lambda value); and outputting the first to fourth lambda values to the controller.

The step of determining whether the CVVD driving unit is misaligned may further include the steps of when one of the first to fourth lambda values is less than or equal to a first predetermined value, determining the lambda value to be lean, when one of the first to fourth lambda values is greater than or equal to a second predetermined value, determining the lambda value to be rich, and when one of the first to fourth lambda values is greater than the first predetermined value and less than the second predetermined value, determining the lambda value to be a theoretical air-fuel ratio value.

The step of starting the engine may include the steps of cranking the engine, determining whether a CVVD learning is compete, and performing engine starting control.

The step of determining whether the CVVD learning is compete may include the step of when the CVVD learning is not complete, performing the CVVD learning.

According to another aspect of the present disclosure, a system for diagnosing an engine system including a continuous variable valve duration (CVVD) apparatus may include a driving unit of the CVVD apparatus including a first driving unit and a second driving unit, a CVVD position detector configured to detect a position of the CVVD apparatus, a camshaft position detector configured to detect a position of the camshaft, a front lambda detector configured to detect a lambda value at front of intake valve, and a controller configured to detect measured values of the front lambda detector during combustion of first to fourth cylinders (the measured values are first to fourth lambda values), determine whether the CVVD driving unit is misaligned according to the detected first to fourth lambda values, and generate a warning notification when the CVVD driving unit is determined to be misaligned.

When the first and second lambda values are rich and the third and fourth lambda values are lean or when the first and second lambda values are lean and the third and fourth lambda values are rich, the controller may determine the CVVD driving unit to be misaligned, and when the controller does not determine the CVVD driving unit to be misaligned in the prior step, the controller may detect the first to fourth lambda values again.

When one of the first to fourth lambda values is less than or equal to a first predetermined value, the controller determines the lambda value to be lean. When one of the first to fourth lambda values is greater than or equal to a second predetermined value, the controller determines the lambda value to be rich. Furthermore, when one of the first to fourth lambda value is greater than the first predetermined value and less than the second predetermined value, the controller determines the lambda value to be a theoretical air-fuel ratio value.

When the engine cranking is performed, the controller determines whether a CVVD learning is completed, and when the CVVD leaning is not completed, the controller performs the CVVD learning. Furthermore, when the CVVD learning is completed, the controller performs engine starting control.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 15A:
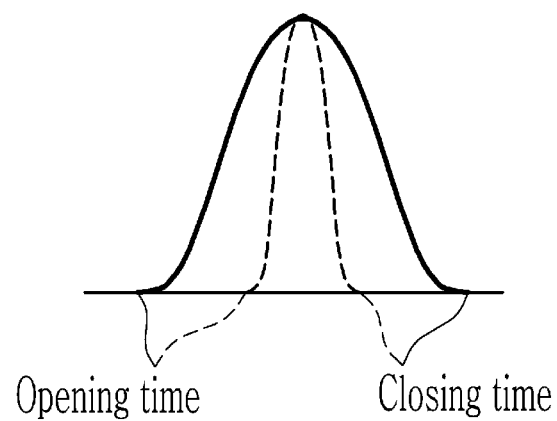
Figure 15B:
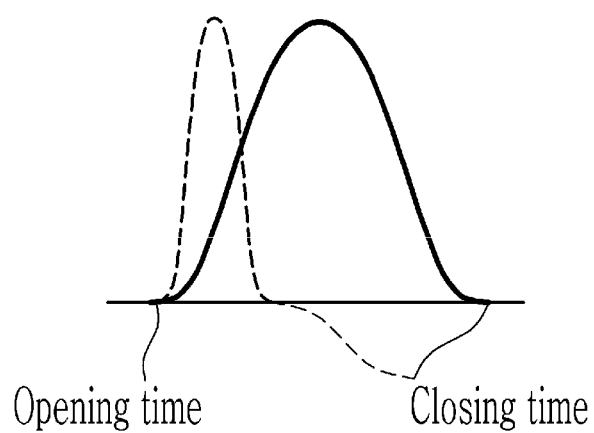
Figure 15C:
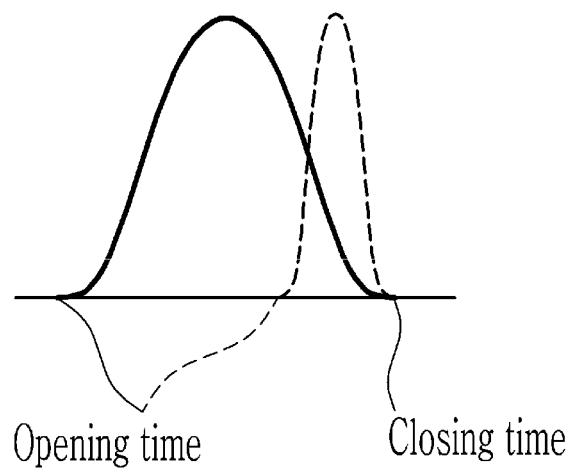
Figure 16A:
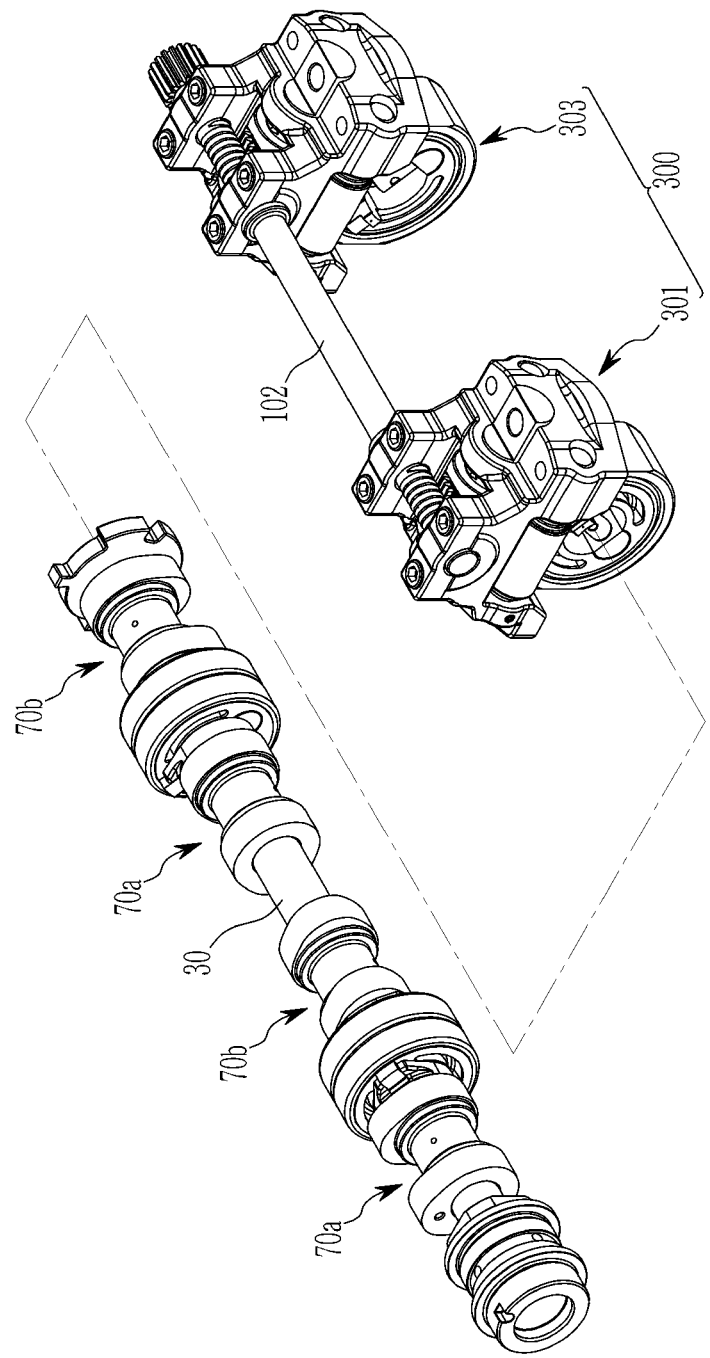
Figure 16B:
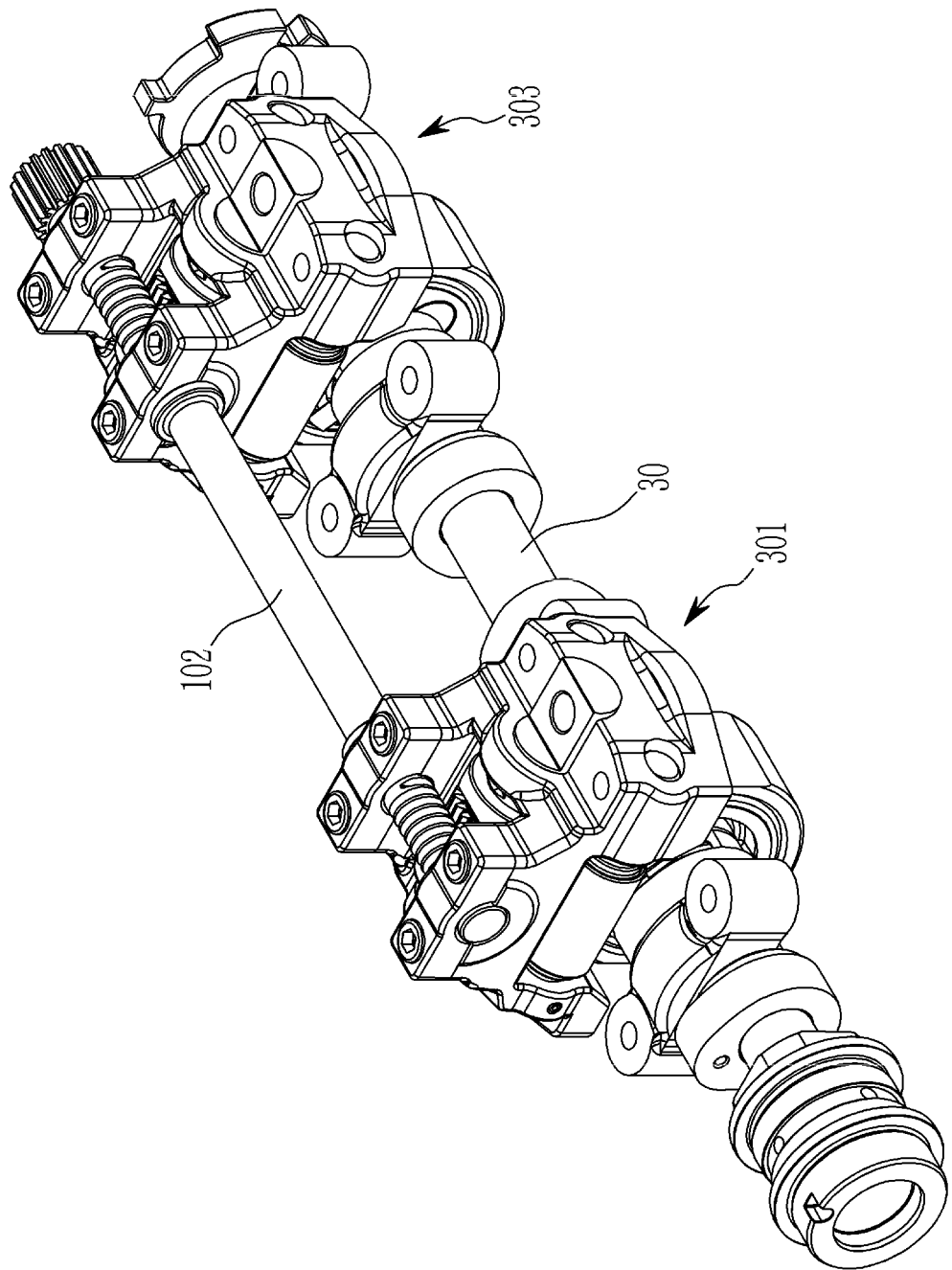
Figure 17:
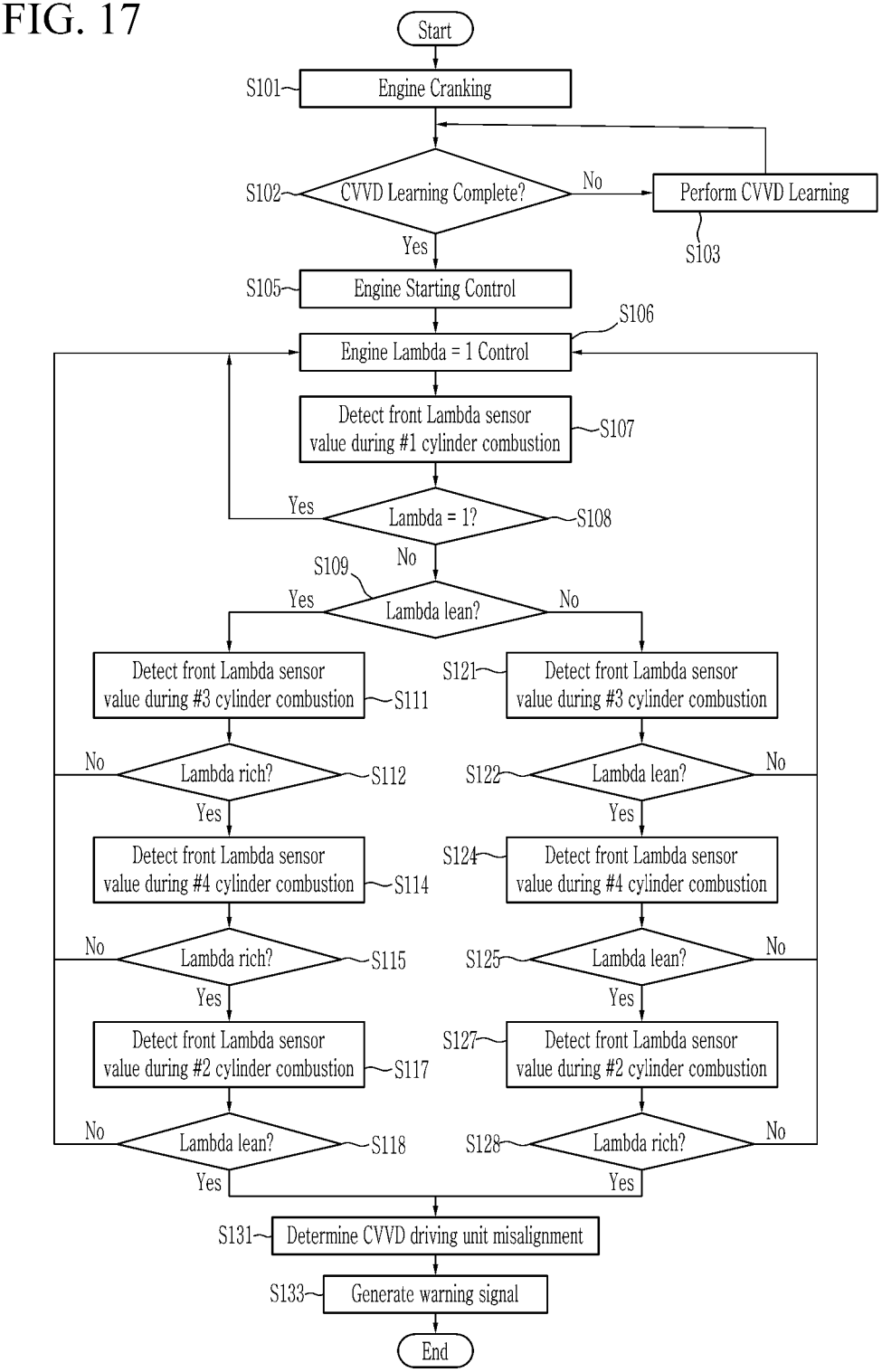

FIGS. 15A, 15B, and 15C are graphs showing valve profile of a continuous variable valve duration apparatus according to an exemplary form of the present disclosure;

FIGS. 16A and 16B are illustrating process of assembling control shaft and driving unit of a continuous variable valve duration (CVVD) apparatus according to an exemplary form of the present disclosure; and FIG. 17 is a flowchart illustrating a method for diagnosing an engine system including a continuous variable valve duration (CVVD) apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, the thickness of layers, films, panels, regions, etc., are exaggerated for clarity.

In specification, unless explicitly described to the contrary, the word "comprise" and variations such as "comprises" or "comprising", will be understood to imply the inclusion of stated elements but not the exclusion of any other elements.

Figure 1:
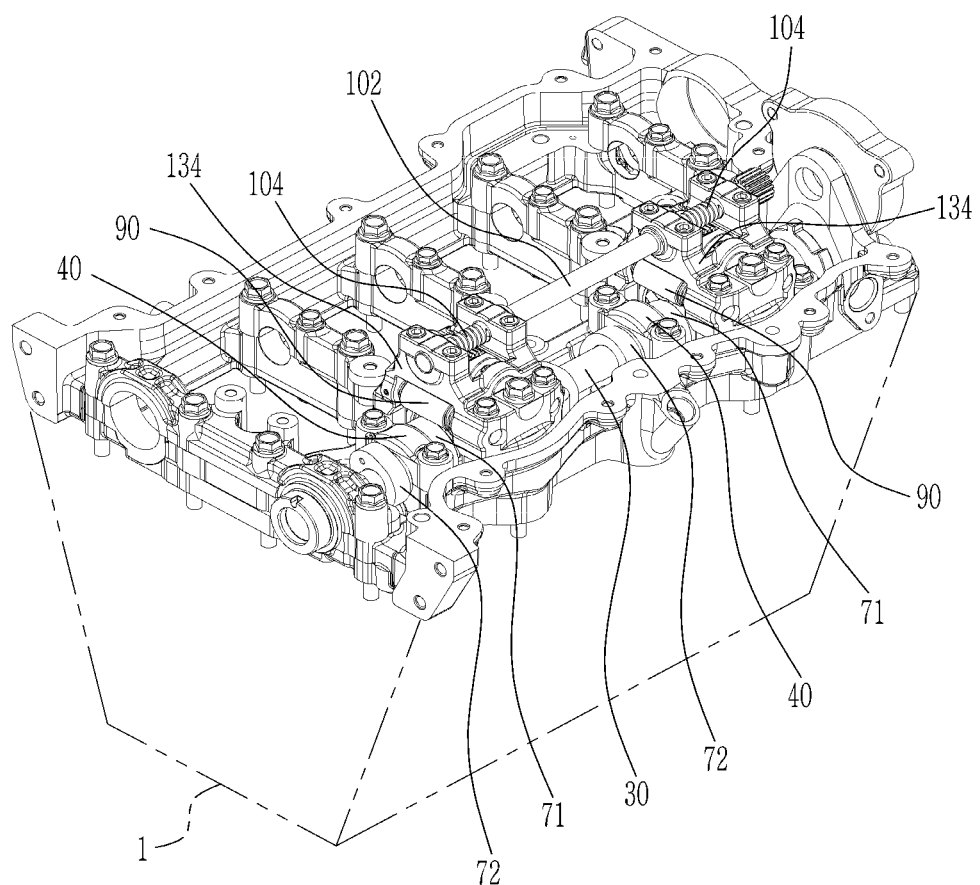
FIG. 1 is a perspective view of an engine provided with a continuous variable valve duration apparatus according to an exemplary form of the present disclosure.
Figure 2:
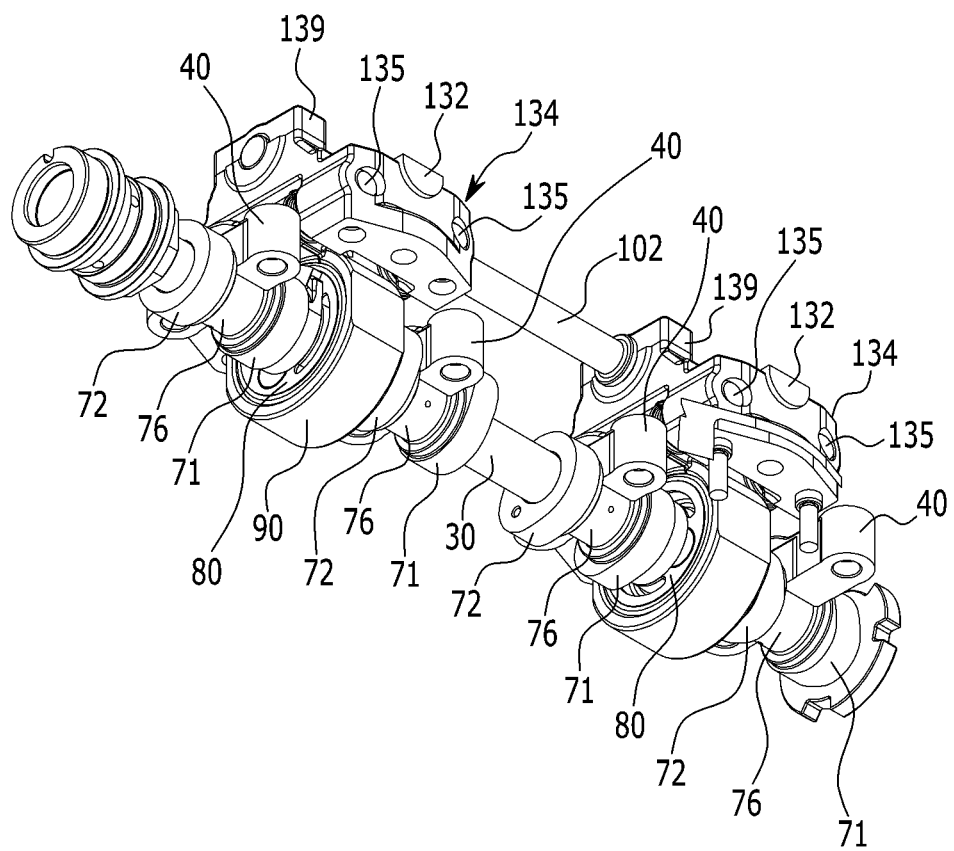
FIG. 2 is a perspective view of a continuous variable valve duration apparatus according to an exemplary form of the present disclosure.

FIG. 1 is a perspective view of an engine provided with a continuous variable valve duration (CVVD) apparatus according to an exemplary form of the present disclosure and FIG. 2 is a perspective view of the continuous variable valve duration (CVVD) apparatus of FIG. 1.

Figure 3:
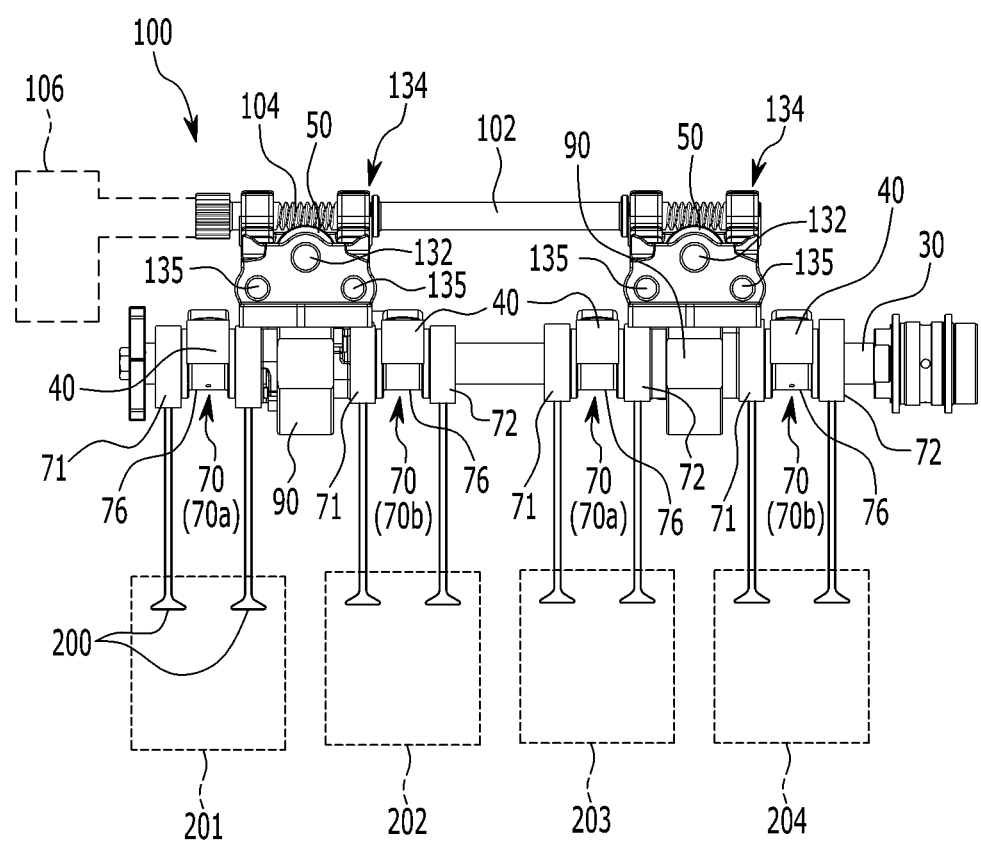
FIG. 3 is a side view of a continuous variable valve duration apparatus according to an exemplary form of the present disclosure.
Figure 4:
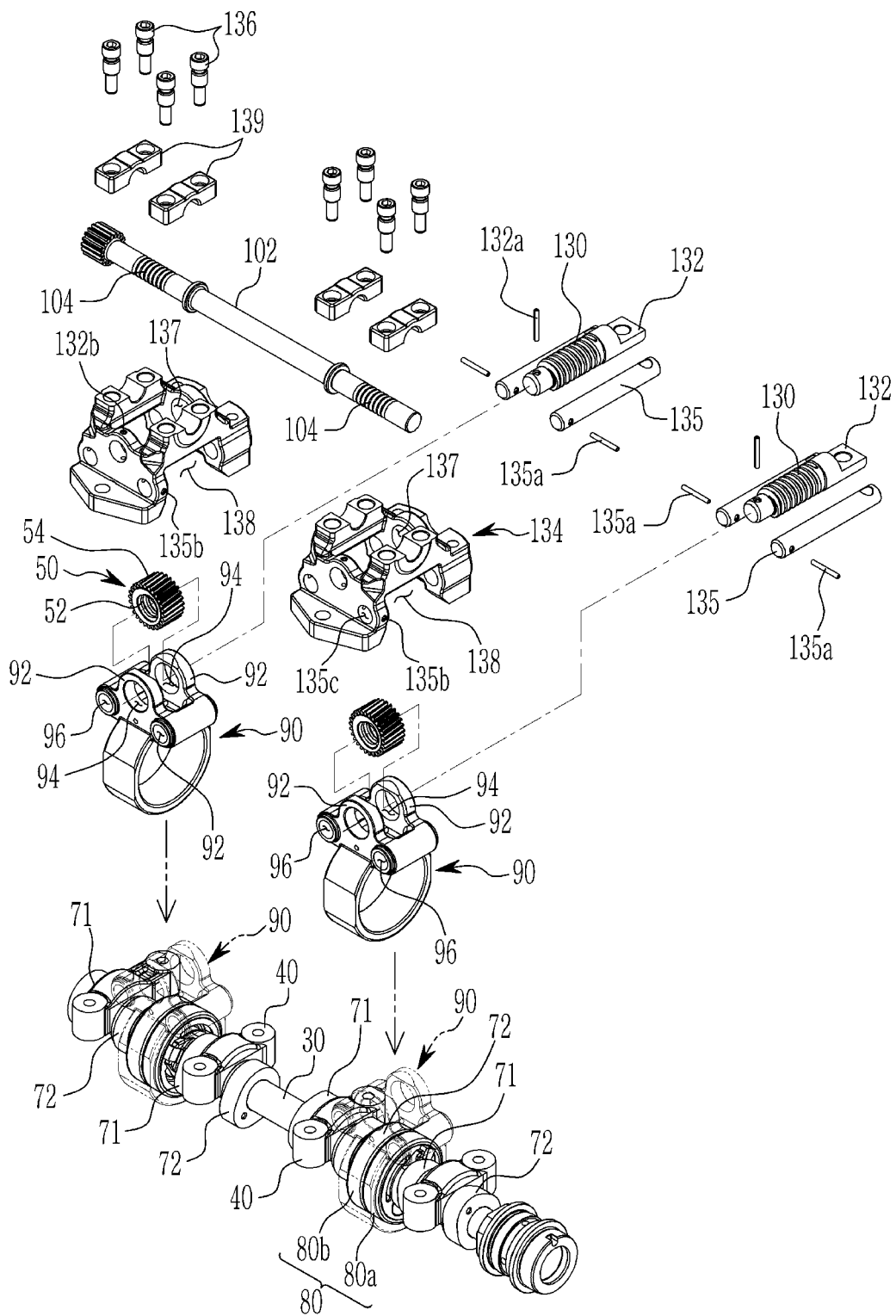
FIG. 4 is an exploded perspective view of a continuous variable valve duration apparatus according to an exemplary form of the present disclosure.

FIG. 3 is a side view of the continuous variable valve duration (CVVD) apparatus of FIG. 2 and FIG. 4 is an exploded perspective view of the continuous variable valve duration (CVVD) apparatus of FIG. 2.

Figure 5:
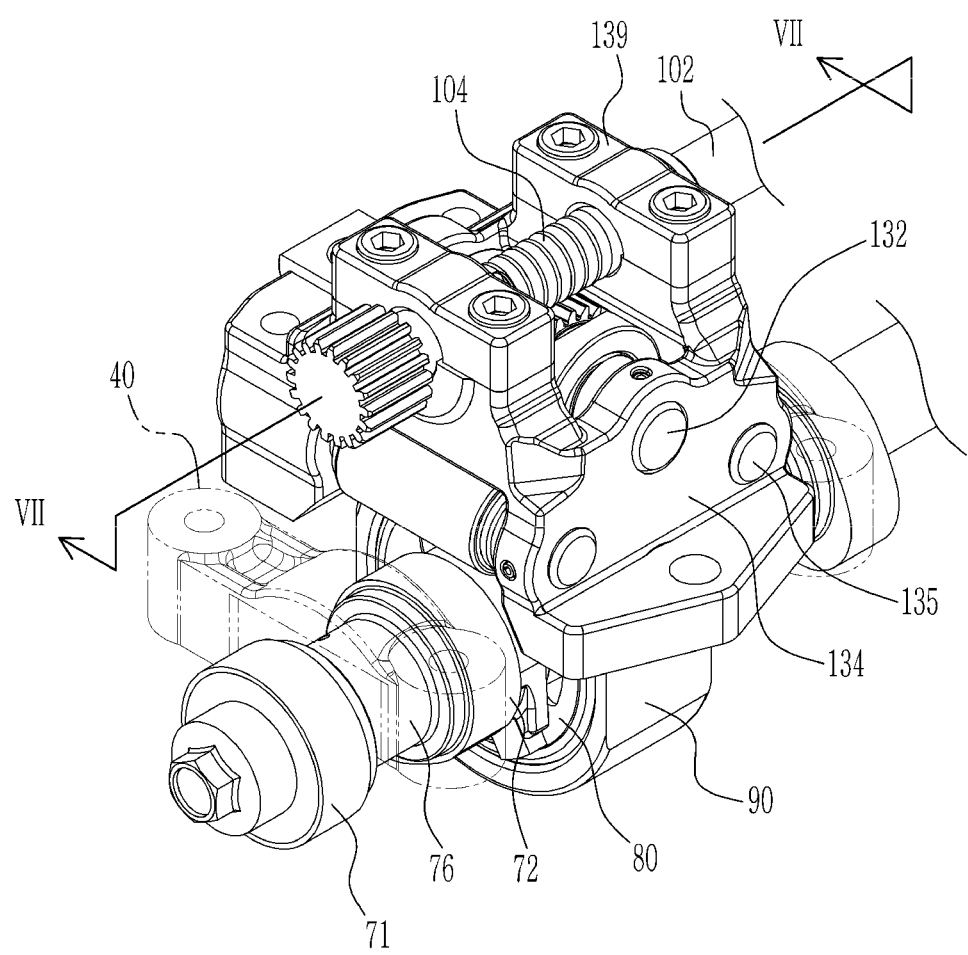
FIG. 5 is a partial exploded perspective view of a continuous variable valve duration apparatus according to an exemplary form of the present disclosure.
Figure 6:
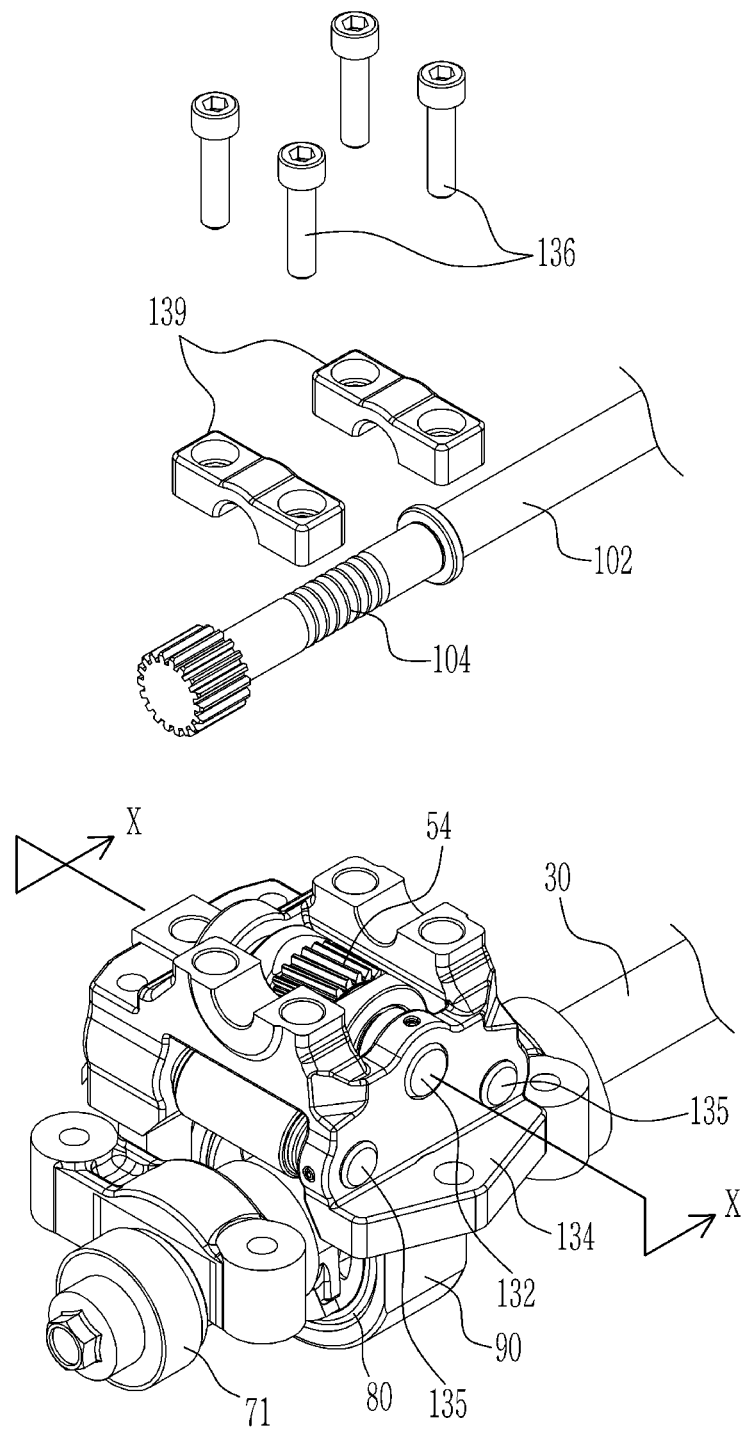
FIG. 6 is a partial exploded perspective view of a continuous variable valve duration apparatus according to an exemplary form of the present disclosure.
Figure 7:
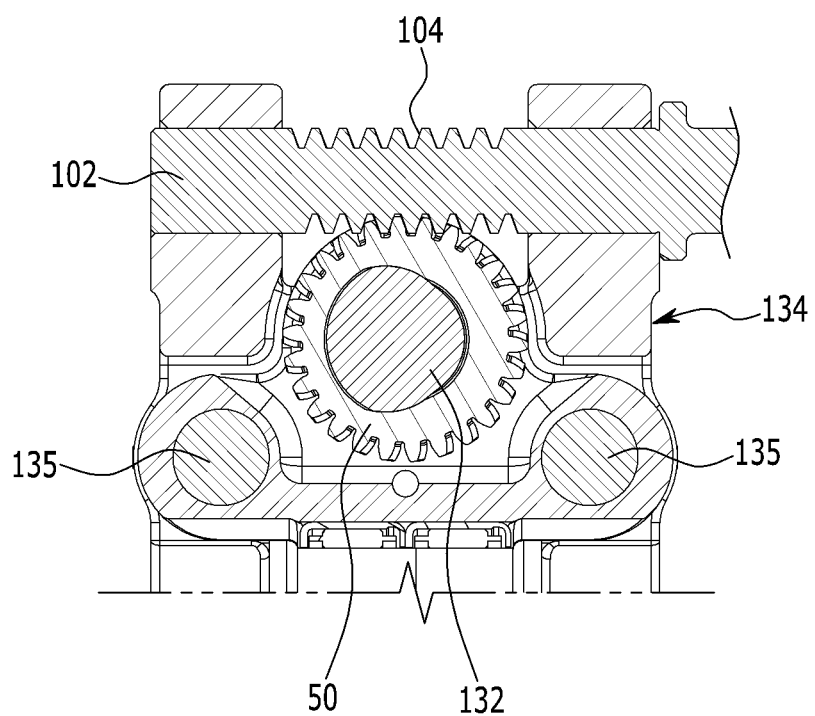
FIG. 7 is a cross-sectional view along line VII-VII of FIG. 5.

FIG. 5 is a partial exploded perspective view of the continuous variable valve duration apparatus of FIG. 2, FIG. 6 is a partial exploded perspective view of the continuous variable valve duration (CVVD) apparatus of FIG. 2, and FIG. 7 is a cross-sectional view along line VII-VII of FIG. 5.

Referring to FIG. 1 through FIG. 7, an engine 1 according to an exemplary form of the present disclosure includes a continuous variable valve duration (CVVD) apparatus.

As shown in FIG. 3, four (4) cylinders 201, 202, 203 and 204 are formed to the engine, but it is not limited thereto.

A continuous variable valve duration (CVVD) apparatus according to an exemplary form of the present disclosure includes a camshaft 30, a cam unit 70 on which a cam 71 is formed and of which the camshaft 30 is inserted thereto, an inner wheel 80 configured for transmitting rotation of the camshaft 30 to the cam unit 70, a wheel housing 90 into which the inner wheel 80 is rotatably inserted and movable perpendicular to the camshaft 30, a guide shaft 132 on which a guide screw thread 130 is formed and disposed perpendicular to the camshaft 30, a worm wheel 50 to which an inner screw thread 52 configured for engaging with the guide screw thread 130 is formed therewithin and the worm wheel 50 disposed within the wheel housing 90 and a control shaft 102 on which a control worm 104 configured for engaging with the worm wheel 50 is formed. The control worm 104 is engaged with an outer screw thread 54 formed outer periphery of the worm wheel 50.

The continuous variable valve duration apparatus further includes a guide bracket 134 to which the guide shaft 132 is mounted.

In this case, a valve duration means opening duration of a valve. That is a duration from valve opening to valve closing.

The camshaft 30 may be an intake camshaft or an exhaust camshaft.

A fixing hole 137 to which the guide shaft 132 is fixed and a moving space 138 within which the wheel housing is movable is formed to the guide bracket 134.

Two guide walls 92 protruded from the wheel housing 90 are formed and a moving hole 94 in which the guide shaft 132 is inserted is formed to the each guide wall 92.

The worm wheel 50 is disposed between the guide walls 92 and selectively rotates to push the guide wall 92 for the wheel housing 90 to be moved.

The continuous variable valve duration apparatus further includes a sliding shaft 135 fixed to the guide bracket 134 through a hole 135c configured for guiding movement of the wheel housing 90 and a sliding hole 96 into which the sliding shaft 135 is inserted is formed to the wheel housing 90.

The continuous variable valve duration apparatus further includes a worm shaft cap 139 fixed to the guide bracket 134 configured for supporting the control shaft 102. The worm shaft cap 139 may be fixed to the guide bracket 134 through bolts 136.

Connecting scheme of the guide bracket 134, the wheel housing 90 and the worm wheel 50 may simplify and reduce layout of the continuous variable valve duration apparatus.

The guide shaft 132 may be mounted to the guide bracket 134 through a hole 132b formed to the guide bracket 134 by inserting a connecting pin 132a.

Also, the sliding shaft 135 may be mounted to the guide bracket 134 through a hole 135b formed to the guide bracket 134 by inserting a connecting pin 135a.

Figure 8:
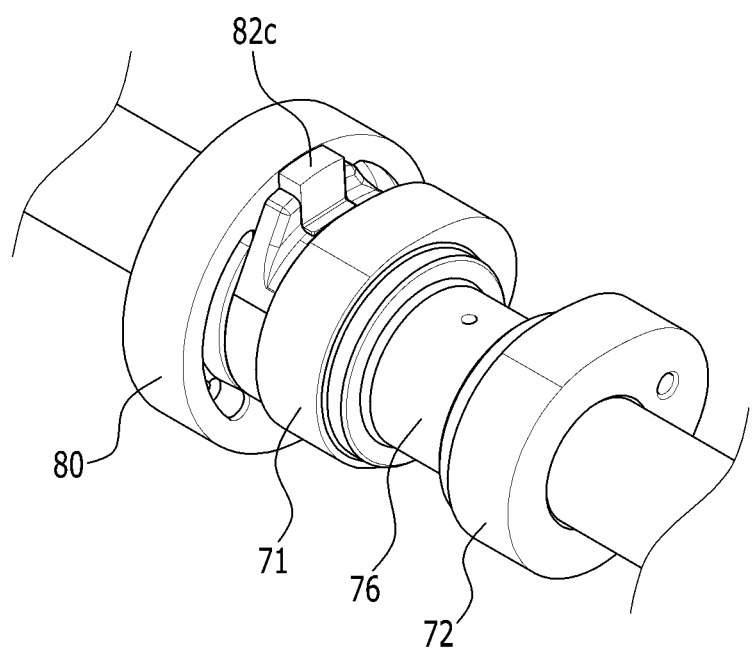
FIG. 8 and FIG. 9 are showing an inner wheel and a cam unit of a continuous variable valve duration apparatus according to an exemplary form of the present disclosure.
Figure 9:
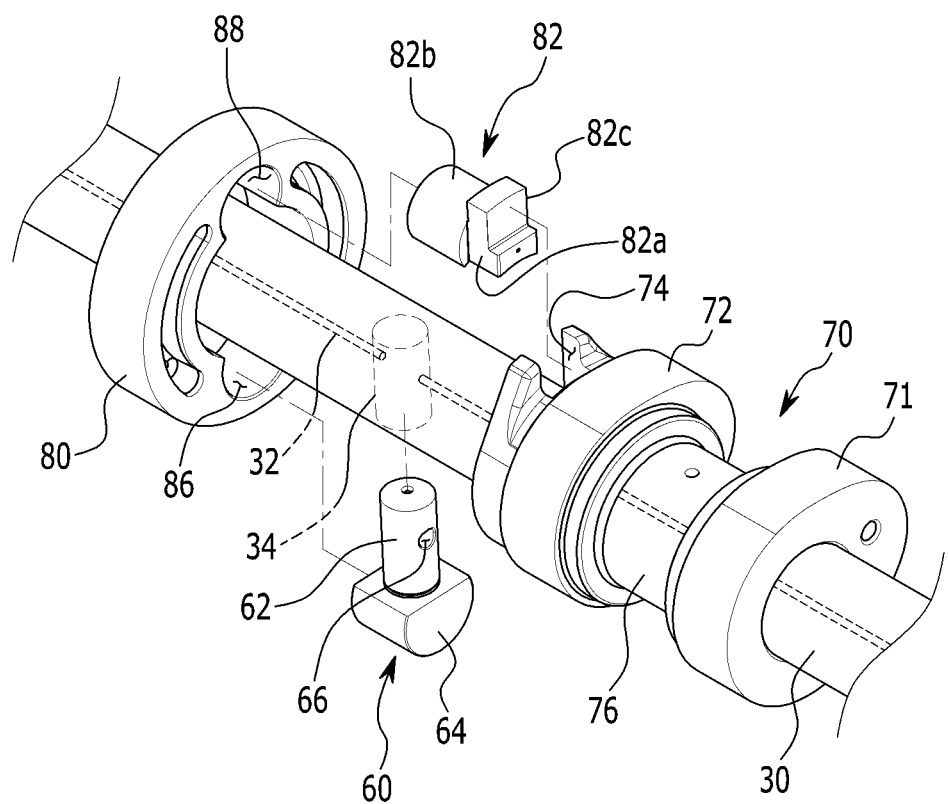
Figure 10:
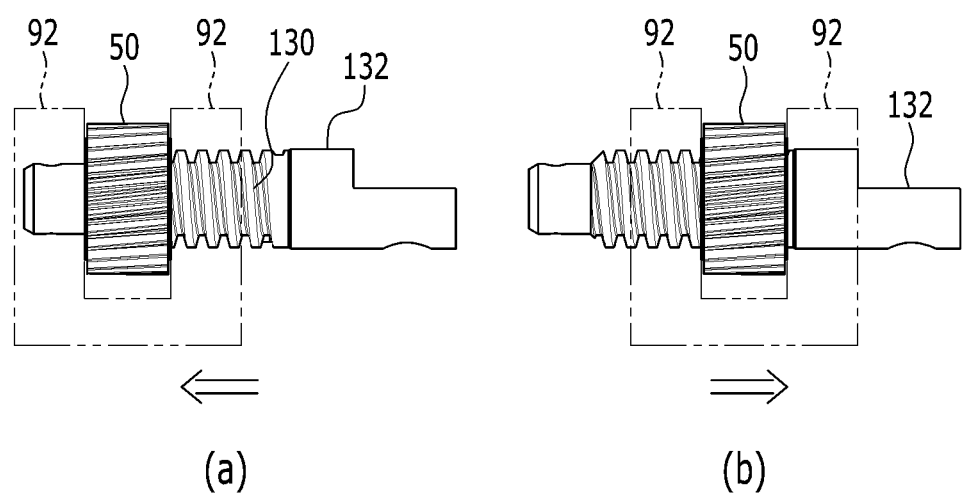
FIG. 10 is a cross-sectional view along line X-X of FIG. 6.

FIG. 8 and FIG. 9 are showing an inner wheel and a cam unit of a continuous variable valve duration apparatus according to an exemplary form of the present disclosure, and FIG. 10 is a cross-sectional view along line X-X of FIG. 6.

Referring to FIG. 1 through FIG. 10, a first sliding hole 86 and a second sliding hole 88 are each formed in the inner wheel 80 and a cam slot 74 is formed to the cam unit 70.

The continuous variable valve duration apparatus further includes a roller wheel 60 connected to the camshaft 30 and rotatably inserted into the first sliding hole 86 and a roller cam 82 slidably inserted into the cam slot 74 and rotatably inserted into the second sliding hole 88.

The roller cam 82 includes a roller cam body 82a slidably inserted into the cam slot 74 and a cam head 82b rotatably inserted into the second sliding hole 88.

A protrusion 82c is formed at the roller cam 82 for preventing or inhibiting the roller cam 82 from being separated from the inner wheel 80 along the longitudinal direction of the camshaft 30.

The roller wheel 60 includes a wheel body 62 slidably connected to the camshaft 30 and a wheel head 64 rotatably inserted into the first sliding hole 86, and the wheel body 62 and the wheel head 64 may be integrally formed.

A camshaft hole 34 is formed to the camshaft 30, the wheel body 62 of the roller wheel 60 is movably inserted into the camshaft hole 34 and the wheel head 64 is rotatably inserted into the first sliding hole 86.

A camshaft oil hole 32 is formed within the camshaft 30 along a longitudinal direction thereof, a body oil hole 66 communicating with the camshaft oil hole 32 is formed to the wheel body 62 of the roller wheel 60, and an oil groove 68 (referring to FIG. 11) communicating with the body oil hole 66 is formed to the wheel head 64 of the roller wheel 60.

Lubricant supplied to the camshaft oil hole 32 may be supplied to the inner wheel 80 through the body oil hole 66, the communicate hole 69 and the oil groove 68.

The cam unit 70 includes a first cam portion 70a and a second cam portion 70b, which are disposed corresponding to a cylinder and an adjacent cylinder respectively, for example, the first cylinder 201 and the adjacent second cylinder 202. The inner wheel 80 includes a first inner wheel 80a and a second inner wheel 80b transmitting rotation of the camshaft 30 to the first cam portion 70a and the second cam portion 70b respectively.

Two cams 71 and 72 may be formed on the first and the second cam portions 70a and 70b as a pair and a cam cap connecting portion 76 is formed between the paired cams 71 and 72 of each of the first and second cam portions 70a and 70b.

The cams 71 and 72 rotate and open the valve 200.

The continuously variable valve timing apparatus further includes a cam cap 40 on which a cam supporting portion 46 configured to rotatably support the cam cap connecting portion 76 is formed on the cam cap 40.

Figure 11:
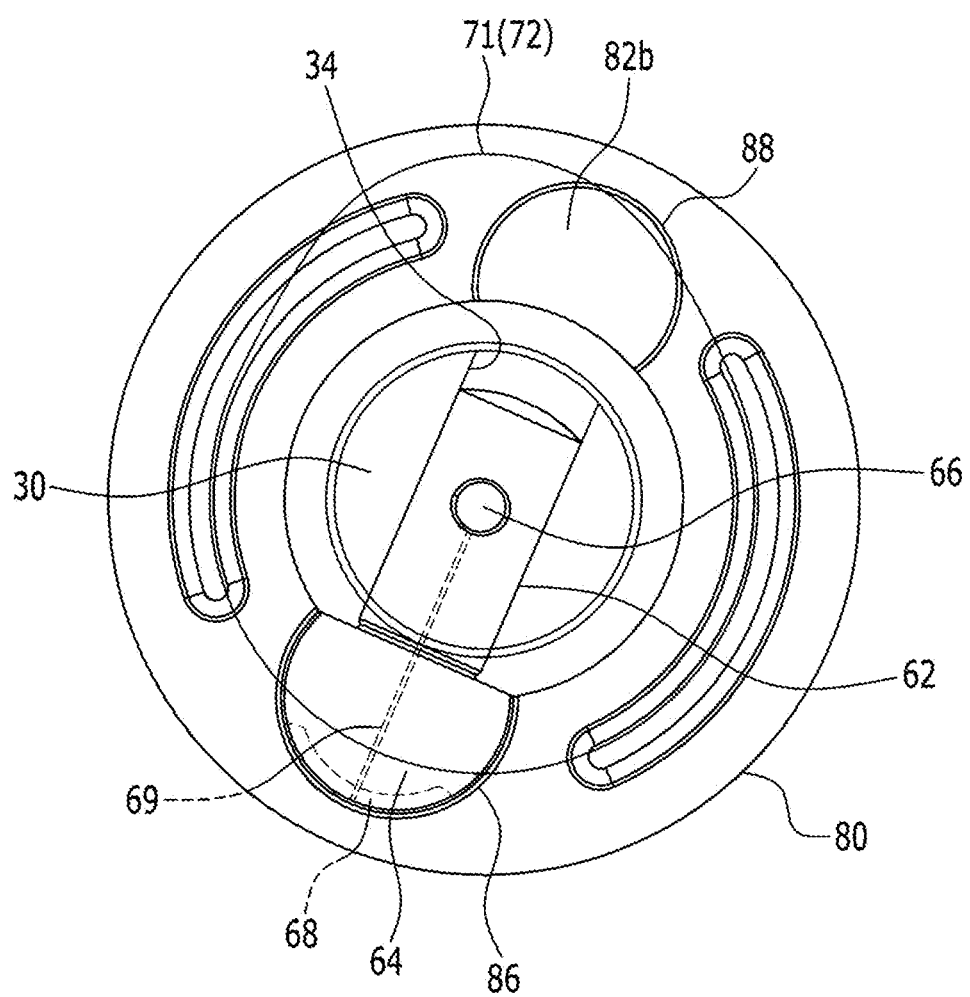
FIG. 11 to FIG. 13 are showing an inner wheel of a continuous variable valve duration apparatus according to an exemplary form of the present disclosure.
Figure 12:
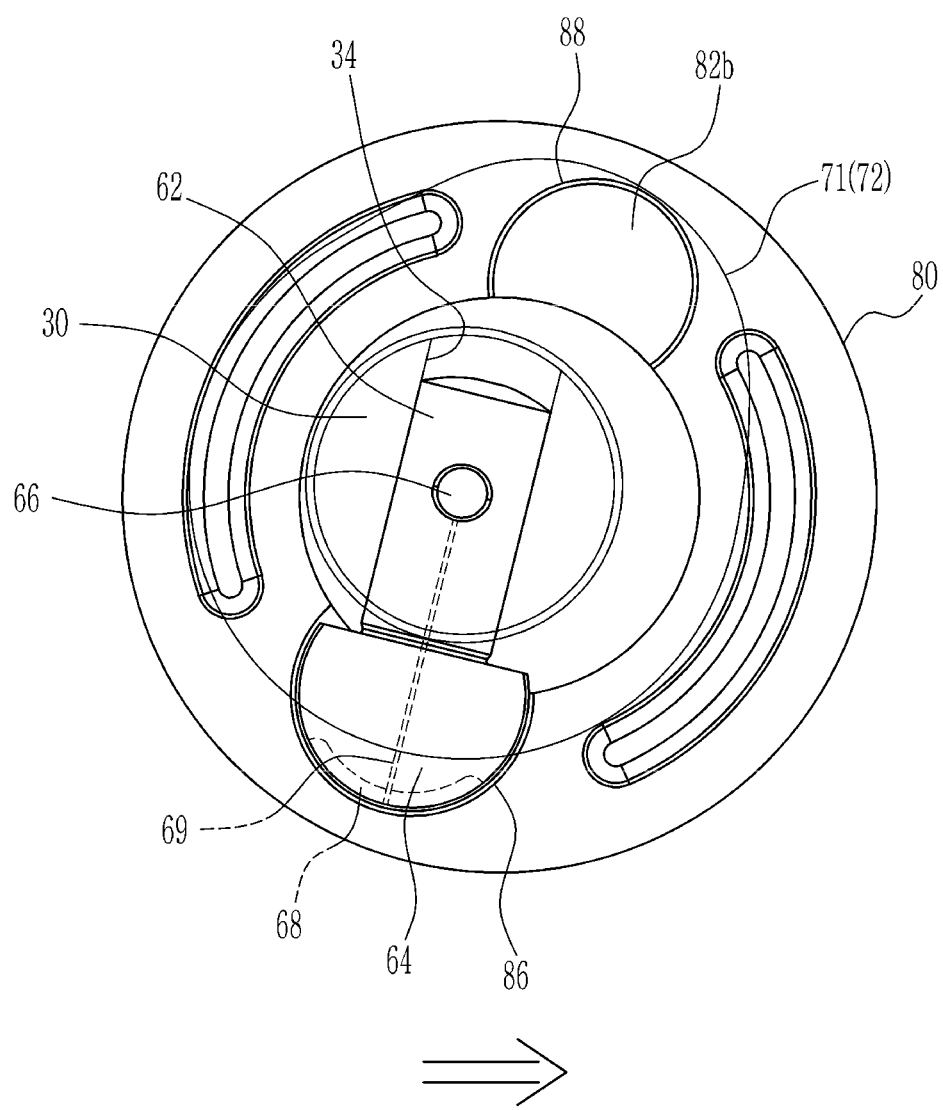
Figure 13:
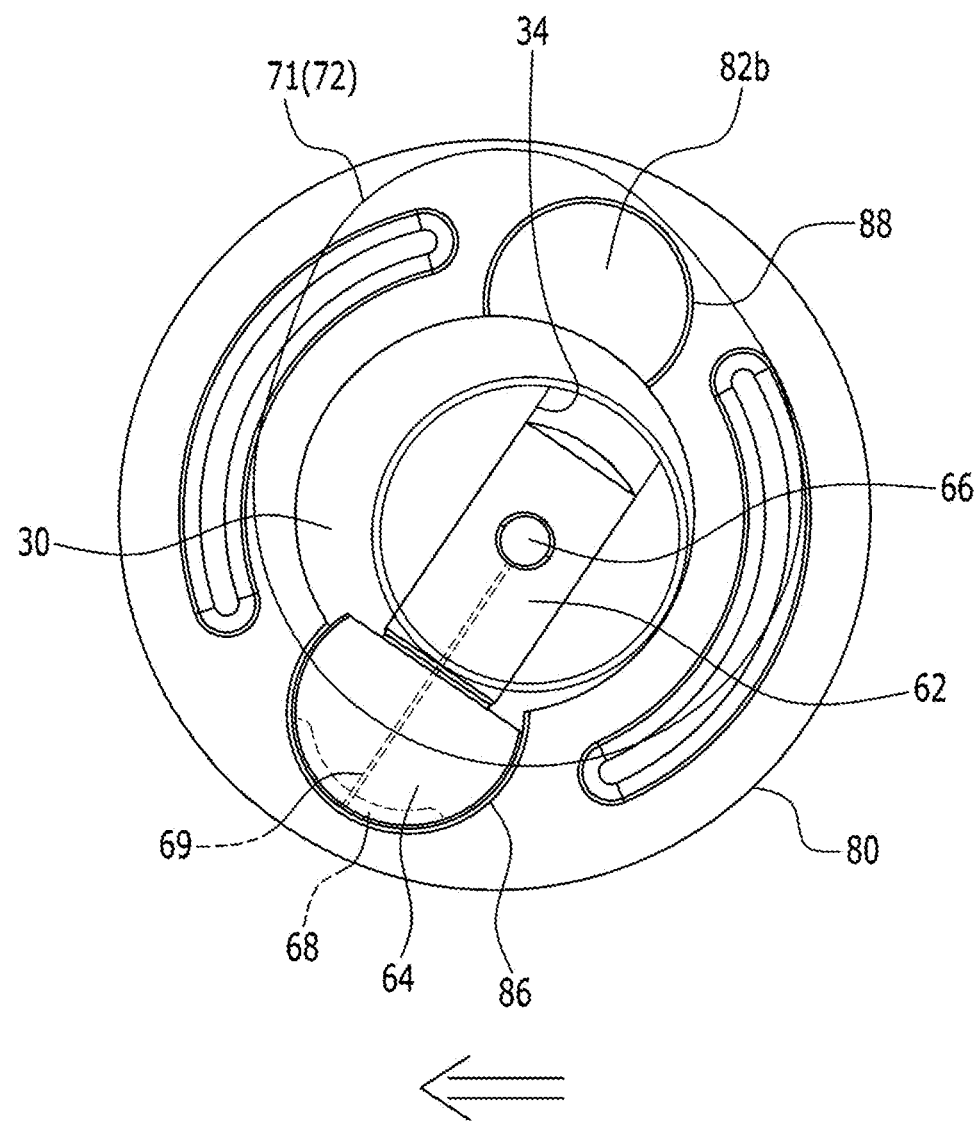

FIG. 11 through FIG. 13 are showing operations of an inner wheel 80 of a continuous variable valve duration apparatus according to an exemplary form of the present disclosure.

As shown in FIG. 11, when rotation centers of the camshaft 30 and the cam unit 70 are coincident, the cams 71 and 72 rotate with the same phase angle of the camshaft 30.

According to engine operation states, an ECU (engine control unit or electric control unit) transmits control signals to the control portion 100, and then the control motor 106 rotates the control shaft 102.

Then, the control worm 104 rotates the formed outer periphery of the worm wheel 50. And since the inner screw thread 52 formed to the worm wheel 50 is engaged with the guide screw thread 130 and thus the worm wheel 50 moves along the guide screw thread 130.

As shown in FIG. 10, FIG. 12 and FIG. 13, the worm wheel 50 moves along the guide shaft 132 according to rotation of the control shaft 102, and the worm wheel 50 pushes the guide wall 92 so that a relative position of the wheel housing 90 with respect to the camshaft 30 is changed.

When the relative position of the wheel housing 90 with respect to the camshaft 30 is changed, the relative rotation speed of the cams 71 and 72 with respect to the rotation speed of the camshaft 30 is changed.

While the slider pin 60 is rotated together with the camshaft 30, the pin body 62 is slidable within the camshaft hole 34, the pin head 64 is rotatable within the first sliding hole 86, and the roller cam 82 is rotatably disposed within the second sliding hole 88 and slidable within the cam slot 74. Thus, the relative rotation speed of the cams 71 and 72 with respect to the rotation speed of the camshaft 30 is changed.

Figure 14A:
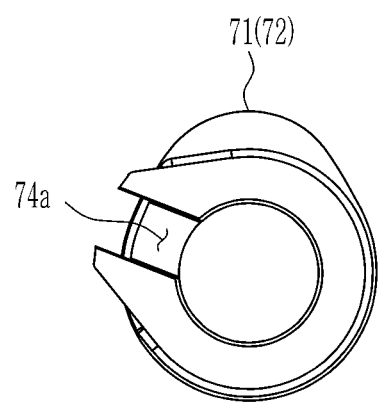
FIGS. 14A and 14B are showing a cam slot of a continuous variable valve duration apparatus according to an exemplary form of the present disclosure.
Figure 14B:
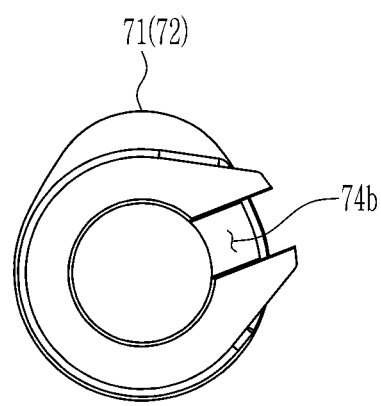

FIGS. 14A and 14B are showing a cam slot of a continuous variable valve duration apparatus according to an exemplary form of the present disclosure and FIGS. 15A, 15B, and 15C are graphs showing valve profile of a continuous variable valve duration apparatus according to an exemplary form of the present disclosure.

As shown in FIGS. 14A and 14B, the cam slot 74 may be formed more retarded than a position of the cam 71 or 72 (referring to (74a) of FIG. 14A), the cam slot 74 may be formed more advanced than a position of the cam 71 or 72 (referring to (74b) of FIG. 14B), or the cam slot 74 may be formed with the same phase of the cam 71 or 72. With the above scheme, various valve profiles may be achieved.

Although maximum lift of the valves 200 is constant, however rotation speed of the cam 71 and 72 with respect to the rotation speed of the camshaft 30 is changed according to relative positions of the slider housing 90 so that closing and opening time of the valves 200 is changed. That is, duration of the valves 200 is changed.

According to the relative position of the cam slot 74, mounting angle of the valves 200, and so on, opening and closing time of the valves may be simultaneously changed as shown in FIG. 15A.

While opening time of the valves 200 is constant, closing time of the valves 200 may be retarded or advanced as shown in FIG. 15B.

While closing time of the valves 200 is constant, opening time of the valve 200 may be retarded or advanced as shown in FIG. 15C.

Now, a method for diagnosing an engine system including a continuous variable valve duration (CVVD) apparatus according to one exemplary form of the present disclosure will be described with reference to FIGS. 16A, 16B, and 17.

FIGS. 16A and 16B are illustrating process of assembling control shaft and driving unit of a continuous variable valve duration (CVVD) apparatus according to an exemplary form of the present disclosure.

Referring to FIGS. 16A and 16B, a driving unit 300 of a continuous variable valve duration (CVVD) apparatus according to an exemplary form of the present disclosure (hereinafter, "CVVD driving unit") consists of a first driving unit 301 and a second driving unit 303.

The first driving unit 301 drives valves of first and second cylinders, and the second driving unit 303 drives valves of third and fourth cylinders of four-cylinder engine.

The CVVD driving unit 300 is formed by assembling the first driving unit 301 and second driving unit 303, and be assembled to a control shaft 102. Particularly, in the case of the CVVD apparatus having two driving units, each driving unit is in charge of two cylinder valves to drive a total of four cylinder valves. In this regard, if the two driving units are not assembled normally such that a misalignment of the driving units is occurred, then the valve control by the CVVD driving unit cannot be performed normally. Accordingly, there is a need for a process of diagnosing these occurrences.

FIG. 17 is a flowchart illustrating a method for diagnosing an engine system including a continuous variable valve duration (CVVD) apparatus according to an exemplary form of the present disclosure.

In general, four-cylinder engines are developed such that each of the four cylinders is ignited in the order of first, third, fourth, and second cylinder. Therefore, hereinafter, it will be described assuming a four-cylinder engine having such a sequence. However, the present disclosure is not limited to it.

Also, hereinafter, regarding lambda values measured by a front lambda detector configured to detect a lambda value at front of intake valve, the lambda values which are less than or equal to a first predetermined value will be expressed as lean. The lambda values which are greater than or equal to a second predetermined value will be expressed as rich. Further, the lambda values which are greater than the first predetermined value and less than the second predetermined value will be expressed as a theoretical air/fuel ratio value.

The state corresponding to the theoretical air/fuel ratio will be expressed as "lambda=1" below.

Referring to FIG. 17, an electronic control unit (ECU) or a controller (not shown) of a system for diagnosing an engine system including a continuous variable valve duration (CVVD) apparatus according to an exemplary form of the present disclosure performs engine cranking for starting of the engine at step S101.

When the engine cranking is performed, the controller determines whether CVVD learning of minimum and maximum value is complete at step S102. When the CVVD learning is not complete, the controller performs the CVVD learning at step S103. The CVVD learning indicates learning minimum value and maximum value of the CVVD apparatus, for feedback control of the CVVD apparatus. The controller may learn a value of long duration as the minimum value of the CVVD apparatus, and learn a value of short duration as the maximum value of the CVVD apparatus. Particularly, by setting the CVVD minimum value as 0% and setting the maximum value as 100%, the controller may perform the feedback control by converting target intake CVVD value and target exhaust CVVD value into percentage value.

When the CVVD learning is determined to be complete, the controller performs engine starting control at step S105.

When the engine starting is complete, the controller performs lambda=1 control. The lambda=1 control indicates that the controller operates the CVVD apparatus according to the status in which air/fuel ratio is lambda=1.

Further, for determining whether the CVVD apparatus is assembled and aligned normally or not, the controller detects measured value of a front lambda detector (not shown), which is configured to detect a lambda value at front of intake valve. Particularly, the controller detects the measured value of the front lambda detector during combustion of first to fourth cylinders at steps S107, S111, S114, S117, S121, S124 and S127.

Hereinafter, the measured values of the front lambda detector during combustion of first to fourth cylinders are called as first to fourth lambda value.

When controller detects the first lambda value at step S107 and the detected first lambda value is determined to be lambda=1 at step S108, the controller performs lambda=1 control at step S106.

Next, when the first lambda value is lean at step S109, the controller detects the third lambda value at step S111.

Next, when the third lambda value is rich at step S112, the controller detects the fourth lambda value at step S114.

Next, when the fourth lambda value is rich at step S115, the controller detects the second lambda value at step S117.

Next, when the second lambda value is lean at step S118, the controller determines that the driving unit is misaligned at step S131, and generate a warning signal informing the driver of this at step S133.

On the other hand, when the first lambda value is rich at step S109, the controller detects the third lambda value at step S121.

Next, when the third lambda value is lean at step S122, the controller detects the fourth lambda value at step S124.

Next, when the fourth lambda value is lean at step S125, the controller detects the second lambda value at step S127.

Next, when the second lambda value is rich at step S128, the controller determines that the driving unit is misaligned at step S131, and generate a warning signal informing the driver of this at step S133.

As described above, when the answer is "No" at each of steps S118 and S128, the controller performs lambda=1 control again at step S106.

When the first driving unit 301 and the second driving unit 303 is assembled abnormally with a certain misalignment, the first and second cylinder valves driven by the first driving unit and the third and fourth cylinder valves driven by the second driving unit may be operated differently. In this case, the first and second lambda values and the third and fourth lambda values may have opposite direction of lambda values. Particularly, in this case, when the first and second lambda values are lean, the third and fourth lambda values may be rich. On the other hand, when the first and second lambda values are rich, the third and fourth lambda values may be lean.

As described above, diagnosis may be performed during manufacturing and inspection process of vehicle. In this case, when the warning signal is generated, the manufacturer or the inspector may readjust or reassemble the driving unit.

Also, as described above, diagnosis may be performed during driving. In this case, when the warning signal is generated, the driver may visit manufacturer or vehicle repair service provider for inspection and reassembly.

As described above, an exemplary form of the present disclosure may provide a method and apparatus for diagnosing an engine system including a continuous variable valve duration (CVVD) apparatus capable of diagnosing whether a misalignment is occurred while a driving unit of the CVVD apparatus is assembled.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the appended claims.

What is claimed is:

1. A method for diagnosing an engine system including a continuous variable valve duration (CVVD) apparatus, a driving unit of the CVVD apparatus including a first driving unit and a second driving unit, a CVVD position detector configured to detect a position of the CVVD apparatus, a camshaft position detector configured to detect a position of a camshaft, a front lambda detector configured to detect a lambda value at front of intake valve, and a controller, the method comprising the steps of:
   starting, by the controller, the engine;
   detecting, by the controller, measured values of the front lambda detector during combustion of first to fourth cylinders, the measured values being first to fourth lambda values;
   determining, by the controller, whether CVVD driving unit is misaligned according to the detected first to fourth lambda values; and
   generating, by the controller, a warning notification when the CVVD driving unit is determined to be misaligned.

2. The method of claim 1, wherein the step of determining whether the CVVD driving unit is misaligned comprises the steps of:
   determining, by the controller, the CVVD driving unit to be misaligned when the first and second lambda values are rich and the third and fourth lambda values are lean or when the first and second lambda values are lean and the third and fourth lambda values are rich; and
   performing, by the controller, the detecting the first to fourth lambda values again.

3. The method of claim 1, wherein the step of detecting the first to fourth lambda values comprises the steps of:
   performing lambda 1 control of the engine;
   checking the measured value of the front lambda detector during combustion of the first cylinder (the first lambda value);
   checking the measured value of the front lambda detector during combustion of the third cylinder (the third lambda value);
   checking the measured value of the front lambda detector during combustion of the fourth cylinder (the fourth lambda value);
   checking the measured value of the front lambda detector during combustion of the second cylinder (the second lambda value); and
   outputting the first to fourth lambda values to the controller.

4. The method of claim 1, wherein the step of determining whether the CVVD driving unit is misaligned further comprises the steps of:
   when one of the first to fourth lambda values is less than or equal to a first predetermined value, determining the lambda value to be lean;
   when one of the first to fourth lambda values is greater than or equal to a second predetermined value, determining the lambda value to be rich; and
   when one of the first to fourth lambda values is greater than the first predetermined value and less than the second predetermined value, determining the lambda value to be a theoretical air-fuel ratio value.

5. The method of claim 1, wherein the step of starting the engine comprises the steps of:
   cranking the engine;
   determining whether a CVVD learning is complete; and
   performing engine starting control.

6. The method of claim 1, wherein the step of determining whether the CVVD learning is complete comprises the step of:
   when the CVVD learning is not complete, performing the CVVD learning.

7. A system for diagnosing an engine system including a continuous variable valve duration (CVVD) apparatus, the system comprising:
   a driving unit of the CVVD apparatus including a first driving unit and a second driving unit;
   a CVVD position detector configured to detect a position of the CVVD apparatus;

a camshaft position detector configured to detect a position of the camshaft;

a front lambda detector configured to detect a lambda value at front of intake valve; and a controller configured to detect measured values of the front lambda detector during combustion of first to fourth cylinders, the measured values being first to fourth lambda values, determine whether the CVVD driving unit is misaligned according to the detected first to fourth lambda values, and generate a warning notification when the CVVD driving unit is determined to be misaligned.

8. The system of claim 7, wherein:

when the first and second lambda values are rich and the third and fourth lambda values are lean or when the first and second lambda values are lean and the third and fourth lambda values are rich, the controller determines the CVVD driving unit to be misaligned, and when the controller does not determine the CVVD driving unit to be misaligned in the prior step, the controller detects the first to fourth lambda values again.

9. The system of claim 7, wherein when one of the first to fourth lambda values is less than or equal to a first predetermined value, the controller determines the lambda value to be lean, wherein when one of the first to fourth lambda values is greater than or equal to a second predetermined value, the controller determines the lambda value to be rich, and wherein when one of the first to fourth lambda value is greater than the first predetermined value and less than the second predetermined value, the controller determines the lambda value to be a theoretical air-fuel ratio value.

10. The system of claim 7, wherein when the engine cranking is performed, the controller determines whether a CVVD learning is completed, wherein when the CVVD leaning is not completed, the controller performs the CVVD learning, and wherein when the CVVD learning is completed, the controller performs engine starting control.

* * * * *